M. K. LEWIS & J. MUNGER.
Improvement in Stalk-Cutters.
No. 114,308. Patented May 2, 1871.
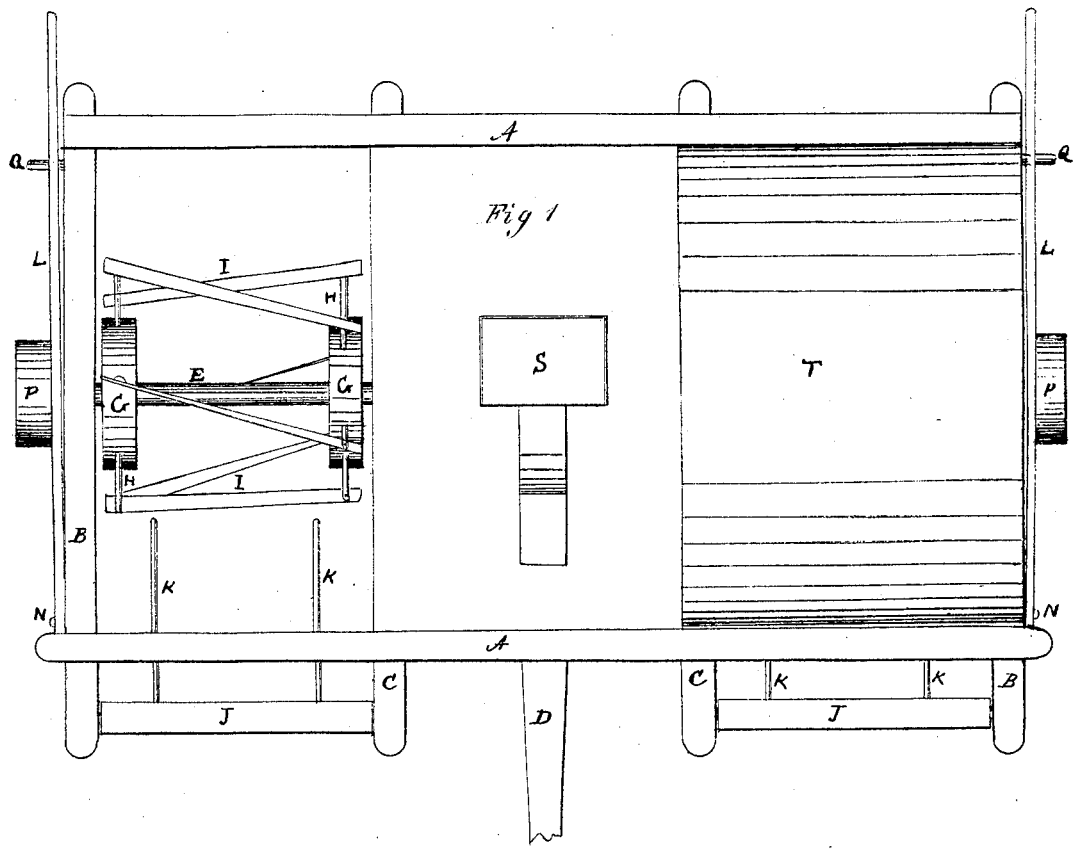
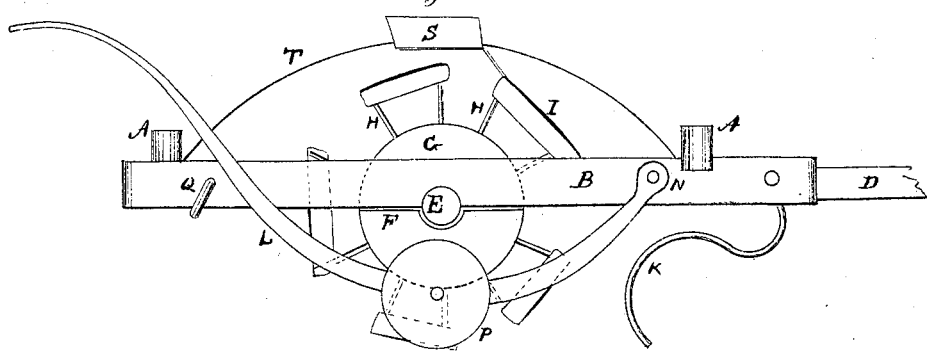
Witnesses.
Inventor.

UNITED STATES PATENT OFFICE.

MILES K. LEWIS AND JOSEPH MUNGER, OF MALCOM, IOWA.

IMPROVEMENT IN STALK-CUTTERS.

Specification forming part of Letters Patent No. 114,308, dated May 2, 1871; application filed October 4, 1870.

*To all whom it may concern:*

Be it known that we, MILES K. LEWIS and JOSEPH MUNGER, both of Malcom, Poweshiek county, State of Iowa, have jointly invented certain new and useful Improvements in Stalk-Cutters, for cutting the stalks of corn, cotton, and other plants remaining on the ground after the valuable part of the crop has been harvested; and we do hereby declare the following description and accompanying drawings are sufficient to enable any person skilled in the art or science to which it most nearly appertains to make and use our said invention and improvements without further invention or experiment.

The nature of our invention and improvements in stalk-cutters consists in the particular construction and arrangement of devices described and claimed in the specification and represented in the drawings.

In the accompanying drawings, Figure 1 is a plan or top view of a machine with our improvements, and Fig. 2 is an elevation of one side.

In these drawings, the cover of the left-hand side is omitted. A A are the front and rear bars of the frame, connected together by the side bars B B and middle bars C C, all of which form the frame of the machine. The tongue D is fastened to the bars A A. To this tongue the animals are hitched, to draw the machine. The axles E are arranged to turn in boxes F fastened to the under side of the bars B and C, and are provided with disks G G, in which the spokes H H are fastened, and to which spokes the spiral knives I I are fastened, which knives, as the machine is drawn along, are pressed upon the stalks of corn, cotton, or other plants, so as to cut them into short pieces, so that they will be more easily and readily covered by the furrow-slice in plowing.

This machine has two cylinders of spiral knives to cut the stalks of two rows of corn or cotton at once, and to draw in any straggling stalks, so as to make them lie nearly parallel to the forward motion of the machine.

We make some rock-shafts, J J, with journals fitted to turn in the forward ends of the bars B and C, and fasten two crooked arms, K K, in each shaft, so that the lower ends of the arms will drag on the ground and draw the straggling stalks into the track or path of the knives. When the machine is not cutting, the arms K K may be turned back over the bar A. To provide some carrying-wheels to carry the knives clear of the ground when not in use, we hang some bent levers, L L, at N N, near the fore end of the bars B, so they will vibrate and fasten the pivots of the carrying-wheels P P in the levers, so that when the levers are depressed and carried under the hooks Q Q the knives will be raised clear of the ground, so as to pass over the stones of a rough road without being dulled. The space between the bars C C is boarded over and a driver's seat, S, arranged on it. We also make a case, T, to cover each set or cylinder of knives, so that the driver may not fall upon and be injured by them.

It is found to be a great advantage, in practice, to arrange the knives spirally, as the stalks cut easier at an angle than directly across. By curving the edges of the knives I and making them conform to the periphery of a cylinder, the machine travels far more steadily than if the knives were straight.

Having described our improvement we claim—

The bent levers L L, in combination with the wheels P P, substantially as described, for the purpose specified.

MILES K. LEWIS.
      JOSEPH MUNGER.

Witnesses:
 JAMES CLARK,
 G. H. TAYLOR.